(12) United States Patent
Bui

(10) Patent No.: US 7,617,276 B2
(45) Date of Patent: Nov. 10, 2009

(54) ECARDS FROM MULTIPLE USERS

(75) Inventor: Susie H. Bui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 11/391,189

(22) Filed: Mar. 27, 2006

(65) Prior Publication Data

US 2007/0226305 A1    Sep. 27, 2007

(51) Int. Cl.
*G06F 15/16* (2006.01)

(52) U.S. Cl. .......................... 709/203; 709/223; 705/14

(58) Field of Classification Search ................ 709/203, 709/206, 219, 223, 224, 229; 705/14, 39, 705/42, 65
See application file for complete search history.

(56) References Cited

U.S. PATENT DOCUMENTS 6,804,806 B1 * 10/2004 Bansal et al. ............... 715/201
2002/0138573 A1 * 9/2002 Saguy ....................... 709/204
2003/0004997 A1 * 1/2003 Parker et al. ............... 707/513
2003/0009566 A1 * 1/2003 Christensen et al. ........ 709/228

* cited by examiner

*Primary Examiner*—Lashonda T Jacobs
(74) *Attorney, Agent, or Firm*—Hickman Palermo Truong & Becker LLP

(57) ABSTRACT

Techniques described herein allow multiple users to sign the same ecard. For example, a first user signs onto an ecard website, and selects an ecard template. After personalizing the ecard, the first user selects an option to invite other users to sign the card. Invitation messages are sent to the invited users. If an invited user accepts the invitation to sign the ecard, the invited user is prompted to login to the ecard website and sign the ecard. Once all the invited users have responded to the invitation, the first user is notified that the ecard is ready to be sent. Before sending the ecard, the first user may preview and modify the ecard. Once the first user is content with the ecard, the first user submits the ecard to the ecard web server to be sent to the intended recipient.

38 Claims, 6 Drawing Sheets

ECARDS FROM MULTIPLE USERS

BACKGROUND

An ecard is an electronic postcard sent from one user to another. Numerous ecard websites provide means for a user to select a virtual postcard and send it to another user. Ecard notifications are typically sent over the Internet and received through email. For example, a user has a friend with an upcoming birthday, and the user wants to send an ecard message to this friend, wishing them a happy birthday. Accordingly, the user accesses an ecard website, selects a prewritten card style with image and message, and possibly adds their own personal message to the card. Then, the user specifies the friend's email address and selects a control to send the ecard. The ecard website then sends to the intended recipient an email message with a link to the ecard provider's website. By following the link in the email message, the recipient accesses and reads the ecard.

It is worth noting that ecards have become fairly sophisticated over time. Moreover, the number of templates available to select from on ecard websites has also increased tremendously. For examples, some ecard websites now have thousands of templates to choose from, some of which include animation, others talking greetings, and yet others are entirely interactive (e.g., asking the recipient to perform an action or press a button).

With the number of ecard choices to select from, and the number of features available when designing the ecard, the process of selecting the "perfect" card (e.g., a card that expresses the right sentiment in the right way) can be time consuming. Thus, once the perfect card has been found, it would be nice to be able to use the ecard in the same way that physical greetings cards are used. With physical greeting cards, it is common for groups of people (e.g. a group a coworkers, members of a family, etc.) to personalize and sign the same card. Unfortunately, current ecard technology does not provide the means for groups to send a single group-signed and group-customized ecard.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques described herein provide mechanisms which allow multiple users to sign and/or customize a single ecard. For example, techniques are provided that allow a sender to log onto an ecard website, select an ecard template, and modify the ecard to personalize it for an intended recipient. After personalizing the ecard, the sender may activate a control to invite other users to sign the card.

In one embodiment, to invite other users to sign the card, the sender selects a multiple user option and enters address information for each of the other users the sender wants to invite to sign the card. Once the address information has been entered, an invitation message is sent to each of those invited users. In one embodiment, an invited user may accept or decline the offer to join in signing the ecard. If an invited user accepts the invitation to sign the ecard, the user is prompted to login to the ecard website and sign the ecard. Once all the invited users have responded to the invitation, the sender is notified that the ecard is ready to be sent.

Before sending the ecard, in one embodiment, the sender may preview the ecard, edit the ecard, or even modify the submitted messages. Subsequently, the sender activates a control that causes the ecard website to send the ecard signed by multiple users to the intended recipient.

User Interface

In one embodiment, to select and design an ecard to send to a recipient user from multiple users, a user accesses an ecard website via a web browser and browses through a list of topics and cards until they find the ecard that they want to send. For the purpose of explanation, the user that selects the ecard shall be referred to herein as the "ecard selector".

In one embodiment, the ecard selector personalizes the ecard and, then, sends invitations to a group of users to invite those users to also sign the ecard. For the purpose of explanation, the users invited to sign the ecard are referred to herein as the "invited users". In an alternative embodiment, the ecard selector personalizes the ecard after sending the invitations to the invited users, so that the invited users see a not-yet-personalized version of the ecard. Then, in one embodiment, the ecard selector and/or invited users can be sent a notification message when changes are made to the ecard.

Figure 1A:
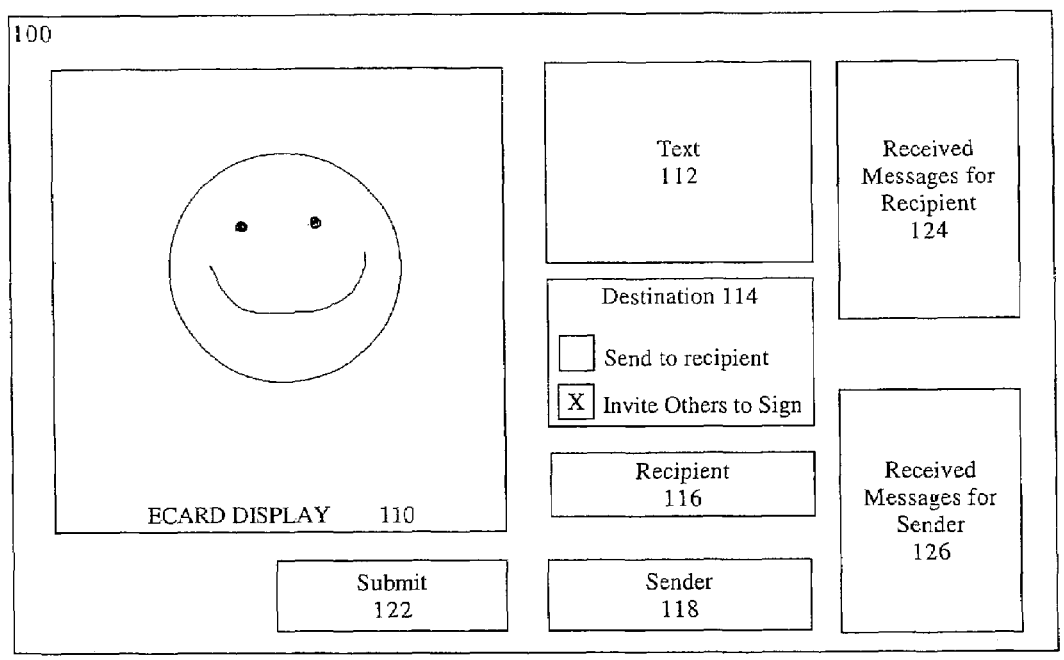
FIG. 1A is a depiction of a user interface for designing an ecard to send to a recipient, according to an embodiment of the invention.

FIG. 1A illustrate an example user interface 100 for designing an ecard to send to a recipient from multiple users. In one embodiment, the user interface 100 includes an ecard display area 110, a text box 112, a destination box 114, a recipient box 116, a ecard selector box 118, a submit button 122, a received-message-for-recipient box 124, and a received-message-for-ecard selector box 126.

In alternative embodiments, the ecard design user interface 100 may include additional features, such as a control to notify the ecard selector when an invited user responds, a control to cancel delivery of the ecard, a control to cancel delivery of the invitations, a control to cancel the current session, a control to save the current design, a control to attach sound files or photos, a control to provide a link to an online store and/or gift certificate, a control to schedule the time and day of ecard delivery, a set of controls to specify access rights to the ecard by other users, and a number of other such features.

In other embodiments, the user interface 110 may include a combination of all these features. Note that, in one embodiment, features of the user interface 100 may be combined into fewer user interface controls. In various embodiments, the features described in connection with FIG. 1A may be spread across multiple ecard-design pages.

In FIG. 1A, the ecard display area 110 shows a preview of the ecard to be sent to a recipient. In one embodiment, the ecard display area 110 allows the ecard selector to personalize the ecard. For example, the ecard selector may customize the ecard by inputting text, photos, sounds, or other content into the ecard template by clicking on the ecard display area 110. Moreover, in one embodiment, clicking the ecard display area 110 allows the ecard selector to select or modify their choice of ecard template.

The text box 112, in one embodiment, is a user interface control through which the ecard selector may input an additional message to the intended recipient. In one embodiment, the text box 112 also allows the ecard selector to customize fonts, colors, and even include additional graphics and other multimedia materials. Some ecard templates may not allow for the entry of a personalized message. Even when the template allows for entry of a personalized message, the ecard selector may choose to leave the text box 112 empty (e.g., the ecard selector does not have to include a message to an intended recipient).

In one embodiment, the destination box 114 allows an ecard selector to indicate whether they would like to forward the selected ecard directly to the intended recipient or whether they would like to ask other users to sign the message before sending the ecard to the intended recipient.

As illustrated in FIG. 1A, the destination box 114 contains two options, "Send to Recipient" and "Invite Others to Sign". In FIG. 1A, the Invite Others to Sign option is selected. Selection of the Invite Others to Sign option indicates that when the ecard selector submits the ecard to be sent, the ecard selector will be presented with option to invite other users to sign the ecard. In alternative embodiments, the destination box 114 may only have one option (e.g., "invite others to sign"). In this type of scenario, if the check box is not checked, the ecard web server assumes the ecard is to go directly to the intended recipient. In other embodiments, other options may be listed.

The recipient box 116 is a user interface control that allows the ecard selector to input the intended recipient's email address or electronic contact information, such as instant messenger identification, text messaging information, etc. In one embodiment, multiple recipients may be listed in the recipient box 116.

In one embodiment, the ecard selector box 118 in FIG. 1A is where the ecard selector inputs his own name and electronic contact information. This information can be used to validate the ecard selector and can also provide means to contact the ecard selector with status updates about the ecard. In one embodiment, the ecard selector box 118 may allow for multiple users to input their name and email addresses into the box.

Finally, the submit button 122 is a user interface control that allows an ecard selector to submit all the information they have entered to the ecard website's server for processing.

Figure 1B:
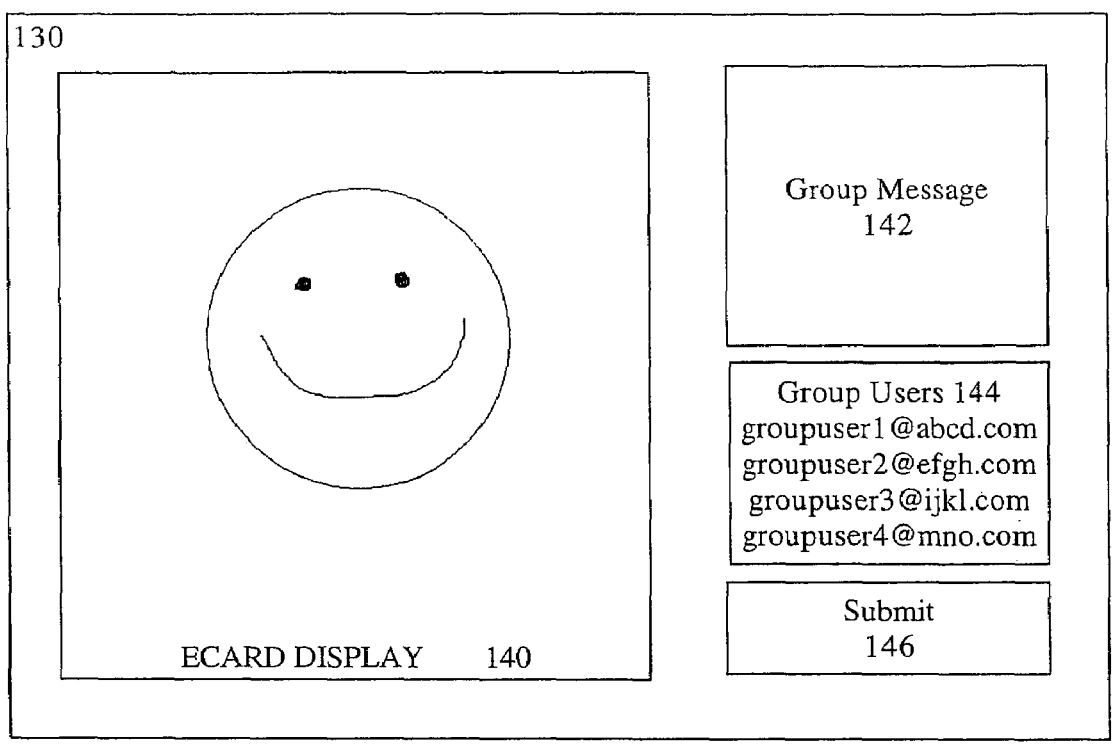
FIG. 1B is a depiction of a user interface for inviting multiple users to sign the ecard, according to an embodiment of the invention.

After an ecard selector has filled out the information in a user interface, such as the user interface 100 illustrated in FIG. 1A, in one embodiment, the ecard selector is presented with another user interface screen that allows the ecard selector to input electronic contact information and some additional comments to a group of users being invited to sign the ecard. FIG. 1B illustrates an example user interface 130 for inviting multiple users to sign the ecard.

In FIG. 1B, user interface 130 includes an ecard display area 140, a group message box 142, a group user box 144, and a submit button. In alternative embodiments, the user interface 130 may include additional features like those discussed in connection with FIG. 1A.

In FIG. 1B, the ecard display area 140 shows a preview of the ecard before it is sent to the users being invited to sign the card. In one embodiment, the preview does not allow further modification of the ecard by the ecard selector.

The group message box 142 is a text box that allows the ecard selector to include comments to the group of invited users. For example, if the ecard selector wants to explain the purpose of the card, ask for additional suggestions on what to say or merely wants to say "hi", the ecard selector has the option to input a message in the group message box 142. That message is displayed to the invited users when they receive invitations to sign the card. For example, the message from the group message box 142 may be displayed either as part of the electronic message sent by the ecard web server, or it may be shown when an invited user logs into the ecard website.

In one embodiment, the group user box 144 provides a way for the ecard selector to input the names and/or electronic contact information of the users they would like to invite to sign the card. The maximum number of invited users that an ecard system may support will vary from implementation to implementation.

The submit button 146 provides the mechanism for the ecard selector to submit his list of invited users to the ecard web server. The ecard web server processes the submitted information and sends invitation messages to the invited users.

Figure 1C:
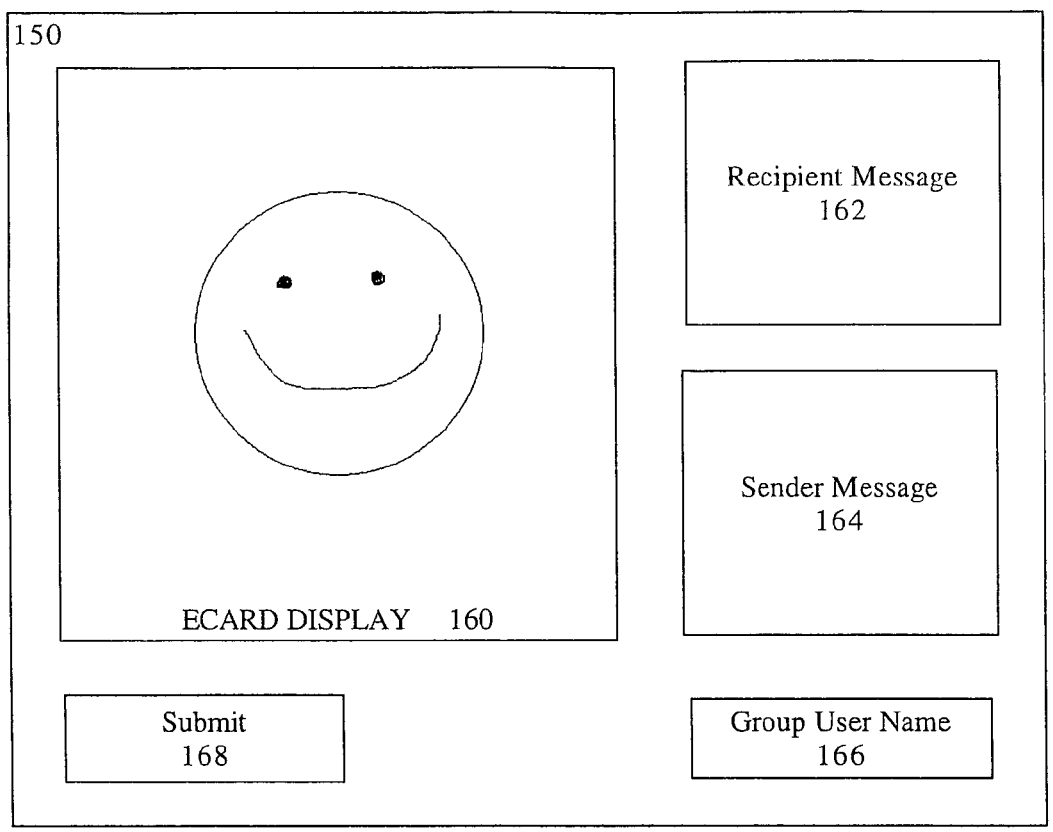
FIG. 1C is a depiction of a user interface for responding to an invitation to sign an ecard, according to an embodiment of the invention

FIG. 1C illustrates an example user interface 150 accessed by the invited users who received an invitation to sign an ecard. In one embodiment, the user interface includes an ecard display area 160, recipient message box 162, an ecard selector message box 164, a user information box 166, and a submit button 168. In alternative embodiments, the user interface 150 may include these and/or other features. For example, in one embodiment, the user interface may provide controls to upload photos, sound files, or other multimedia materials to be included in the ecard.

The ecard display area 160 in FIG. 1C is similar to the ecard display area 140 described in connection with FIG. 1B. Ecard display area 160 provides a preview of the ecard to the invited users. In one embodiment, the ecard display area 160 allows the invited users to change or modify the ecard according to access rights granted by the ecard selector. For example, the ecard selector may have designed the card and specified that no changes could be made to it. Accordingly, the invited users would not be able to modify the ecard. Alternatively, the ecard selector may have granted the right to modify the text in the ecard. In this scenario, the invited users could add or change the text displayed in the ecard.

The recipient message box 162 illustrated in FIG. 1C provides means for each of the invited users to compose and input a personal message to the intended recipient. Note that, in one embodiment, after all the invited users (at least those who elect to respond) have completed filling out the form, the personal messages are compiled into one master list before they are sent to the intended recipient.

In one embodiment, the recipient message box 162 includes a feature that prohibits editing the message (or the portions of the message that were added by invited users) even by the ecard selector. Accordingly, if the ecard selector does not like the message, or the portion of the message that was added by an invited user, then the ecard selector may delete the message (or that portion) entirely. Thus, the ecard selector retains the equivalent of a veto power, but not a "blue-pencil" ability to change what others have written.

In one embodiment, the ecard selector message box 164 provides a mechanism for the invited users to provide feedback to the ecard selector, answer any questions posed to them by the ecard selector, ask questions of their own, make suggestions on how to change or update the ecard, etc.

In one embodiment, the user contact information box 166 allows an invited user to update name and electronic contact information, e.g. to include a preferred name, an alternate email address, a text messaging number, etc.

Finally, the submit button 168 causes the invited user information to be sent back to the ecard website and/or the ecard selector.

Once the invited users have submitted their messages, the ecard selector can access those messages and prepare the ecard to be sent to the intended recipient. Referring back to FIG. 1A, the received-messages-for-recipient box 124 displays the messages received from the invited users. In one embodiment, the messages are listed as text in the order received. Alternatively, the box 124 lists each received message as separate link to a separate file or page that the ecard selector open and view independently of any other message. In one embodiment, the ecard selector may modify or delete specific messages.

In FIG. 1A, the received-messages-for-ecard selector box 126 includes all the comments the invited users have directed to the ecard selector. Those comments include feedback suggestions, multimedia files, and other data that the ecard selector can use to update the ecard. After all the comments and messages have been compiled, the ecard selector selects the "send to recipient" option in the destination box 114 and clicks the submit button. The ecard is then sent to the intended recipient with the ecard selector's message and the invited users' messages as well.

Figure 1D:
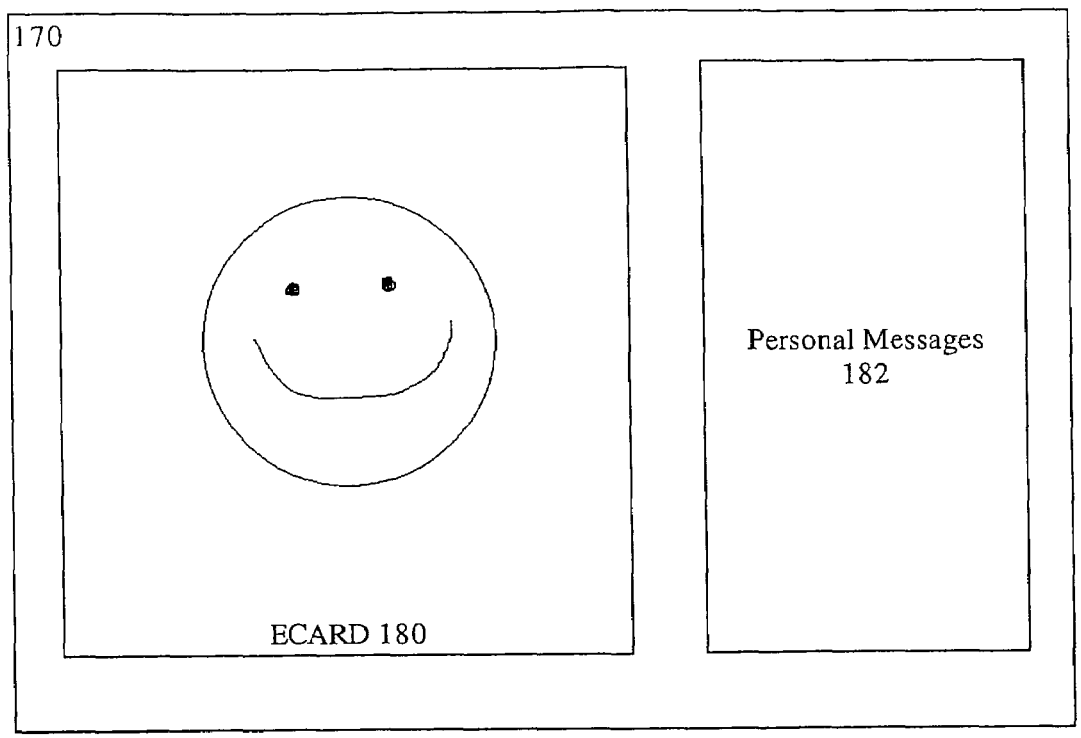
FIG. 1D is a depiction of the user interface received by the recipient, according to an embodiment of the invention.

FIG. 1D shows an example ecard message 170 received by the intended recipient. It shows the ecard 180 on the left side and the personal messages on the right side 182. Note that in one embodiment, the personal messages may be included directly on the ecard. The ecard message may be included in an electronic message or it may be linked to by a link in an electronic message. The ecard message may contain these and/or other features.

Process for Sending an Ecard Signed by Multiple Users

Figure 2:
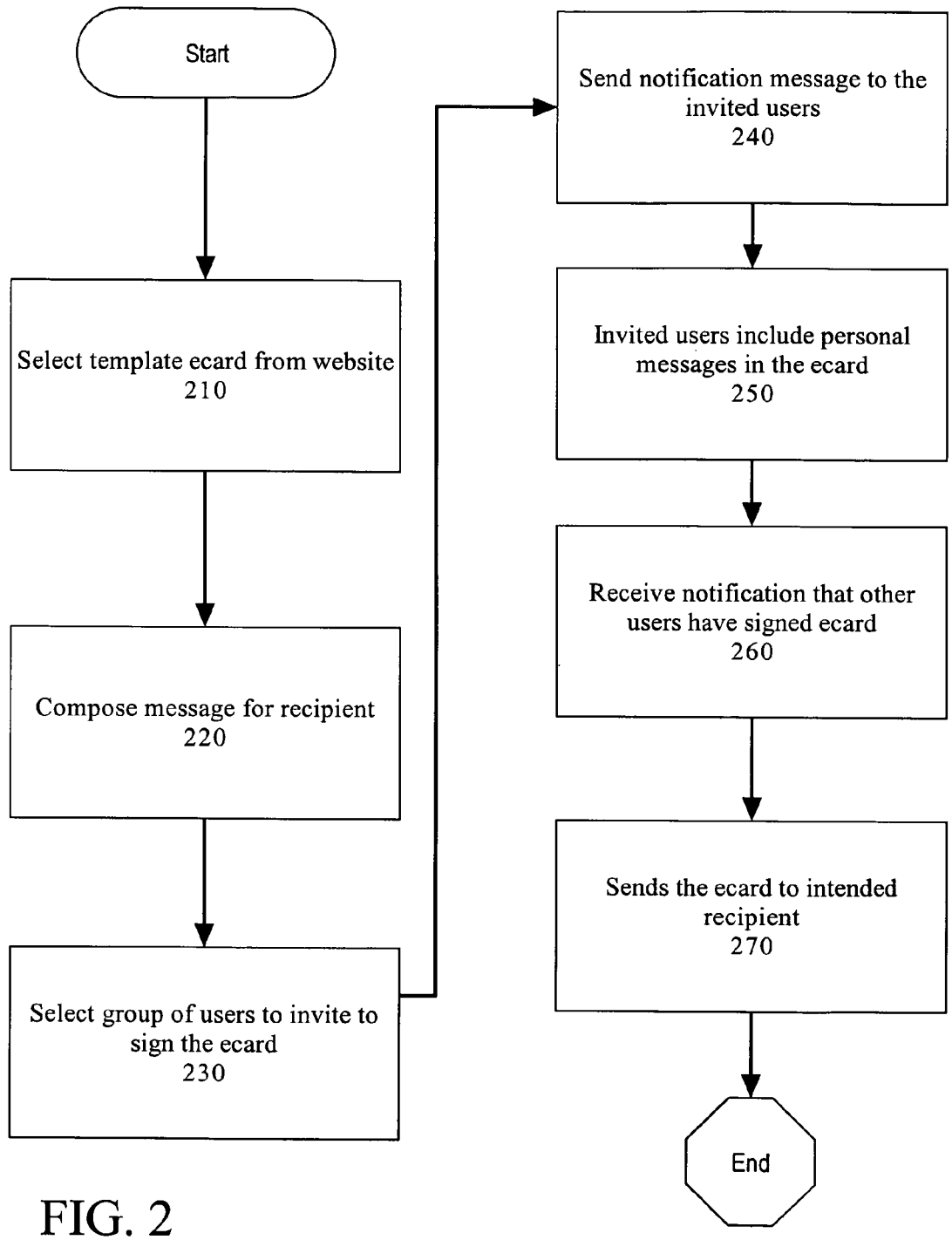
FIG. 2 is a flowchart illustrating steps performed to send an ecard signed by multiple users, according to an embodiment of the invention.

Turning to FIG. 2, it is a flowchart illustrating a procedure 200 for sending an ecard signed by multiple users to a recipient.

At step 210, an ecard selector accesses an ecard website and browses the available ecard templates until they find one they like. In one embodiment, accessing the website includes registering with the website by creating a personal account with the ecard website. The ecard selector registers by submitting information such as their name, email address, and a password. Other information may also be collected.

Once on the ecard website, the ecard selector selects the template ecard and adds personalized touches to the ecard for the intended recipient. In one embodiment, the personalized touches may include adding multimedia content, such as photos, music, or video clips, to the ecard. For example, Jill, a friend of Jack, has an upcoming birthday. Jack wants to wish Jill a happy birthday. Consequently, he accesses an ecard website, browses the site until he find a birthday card he thinks Jill will like, and then adds some personal touches to the ecard. In this example, Jack knows that Jill likes flowers, so, in the ecard, Jack adds some animated flowers that sing a happy birthday song.

At step 220, the ecard selector may write an additional message for the intended recipient. In one embodiment, this message is separate from the ecard template. The message may be a simple text message or it may include multimedia content. For example, after designing the card, Jack decides to write a short message to Jill wishing her a good day. In addition to the written text, he includes a brief audio clip of his own voice singing a happy birthday song.

Once, the ecard and message have been completed, in one embodiment, the ecard selector, at step 230, may elect to invite other users to sign the ecard. FIG. 1A illustrates an example user interface that provides an option to invite multiple users to sign the ecard before sending it to an intended recipient. In one embodiment, the ecard selector manually inputs the email address for each invited user into a multiple user field, such as group users box 144 in FIG. 1B. Alternatively, the ecard selector may import a list of names from an email account or access a previously saved list of names and email addresses. In one embodiment, the ecard selector may use a combination of these techniques to select the users to be invited to sign the ecard. For instance, suppose Jack had never used the ecard website before. Consequently, he manually inputs each name and email address of each of the people he wants to invite to sign the ecard. In one embodiment, once he has entered all the information, he can save the list of email addresses for future use. Alternatively, he imports a list of email addresses from an email account.

When all the names and email addresses for the invited users have been entered, in one embodiment, the ecard selector may write a message to those users. For example, the ecard selector may ask for comments or suggestions on how to make the card better, the ecard selector may explain the reasons for the card, ask for contributions for a group gift, etc.

In one embodiment, the ecard website provides links to online stores and other retail businesses that allow the ecard selector to link to gifts or gift ideas for the intended recipient. A link to the gift or gift idea may be included (either manually or automatically by the webserver) as a portion of the message to the invited users. For example, the ecard website accessed by Jack provides links to a number of online stores that allow users to purchase online gift certificates. Jack decides to purchase an online gift certificate for Jill, and includes as part of his message to the invited users a link so the invited users, too, can contribute to the gift certificate. Alternatively, Jack may decide he wants to buy Jill an MP3 player. Accordingly, he accesses an online store and includes the link to the MP3 player so the invited users can see the gift and determine if they would like to contribute to the gift or not.

Again at step 230, in one embodiment, the ecard selector may set other features, such as access privileges. For example, Jack may be worried that somebody may modify the ecard's format. To prevent such modification, Jack may deny the invited users rights to modify the actual design/template of the ecard. Alternatively, assume Jack has a graphics design guru for a friend. In such a case, he may want to grant access to the design guru friend to spiff up the ecard. Thus, the ecard selector can control, to an extent, the design and of the ecard, while still allowing other users to provide materials to enhance the ecard.

After the ecard selector creates the list of invited users, at step 240, an invitation message is sent to the list of invited users. In one embodiment, the invitation message is an email message or other form of electronic communication, such as an instant message, text message, etc., that contains a link to the ecard on the ecard provider's website. When an invited user receives the message, they can follow the link (e.g., by clicking on a hyperlink in the message or inputting the website information in a browser). In one embodiment, the invited users are asked to login before they can access the ecard. Doing so provides some level of security and avoids outside tampering with the card. In addition, the login may require a user to register with the ecard website. Alternatively, a random login is generated by the ecard website when it sends out the invitation message, or the ecard website may simply use a guest or invited user account to reduce inconvenience to users.

In one embodiment, the invitation message contains a copy of the ecard.

Once the invited users have access to the ecard, at step 250, the invited users may write their own personalized messages to the intended recipient and perform any other tasks permitted by the ecard service. For example, upon accessing the ecard website, the invited users may be presented with a user interface such as the interface illustrated in FIG. 1C. The invited user adds information, such as their name, email, and other comments to the ecard. In one embodiment, some of the invited user's information may include a message for the ecard selector. The invited user then submits the message so it is saved on the ecard website's server.

At step 260, a notification message is sent to the ecard selector when each invited user submits their personalized messages and comments. Alternatively, a tally is maintained by the ecard website and once all users have responded a notification message is sent to the ecard selector. In one embodiment, the invitation message sent to the invited users includes a prompt to accept or decline the offer to sign the ecard. This allows each invited user to easily opt in or out of signing the card.

Once all the invited users who elected to sign have responded, an electronic message is sent to ecard selector. In one embodiment, a timeout feature may be manually set (or set by default) so that after a certain amount of time has passed, the invitation to sign the ecard expires and that invited user is dropped from the tally. Alternatively, a reminder email may be sent to any uninvited users who have yet to respond. Or, a reminder email sent to the ecard selector, so they can follow-up with invited user.

After the ecard selector receives notification that all the invited users have responded, the ecard selector accesses the ecard website again and prepares to send the ecard. In one embodiment, the ecard selector may review, edit, or delete personal messages sent by invited users, review comments directed to the ecard selector, further edit the ecard template, etc. Once the ecard selector is satisfied that the card is ready to be sent, at step, 270, the ecard selector submits the completed ecard to the ecard web server, which in turn sends an ecard message to the intended recipient. In one embodiment, the last invited user to sign the ecard may be prompted to send the ecard.

Returning to the story of Jack and Jill. Once Jack receives a notification email that everybody he invited has signed the card, he logs back onto the ecard website, reviews all the comments and messages made by other users, edits them, perhaps he adds another photo to the ecard that was uploaded by one of the invited users, and then he sends the ecard to Jill. Jill upon receipt of the ecard is pleased to have been remembered on her birthday by so many of her friends.

Hardware Overview

Figure 3:
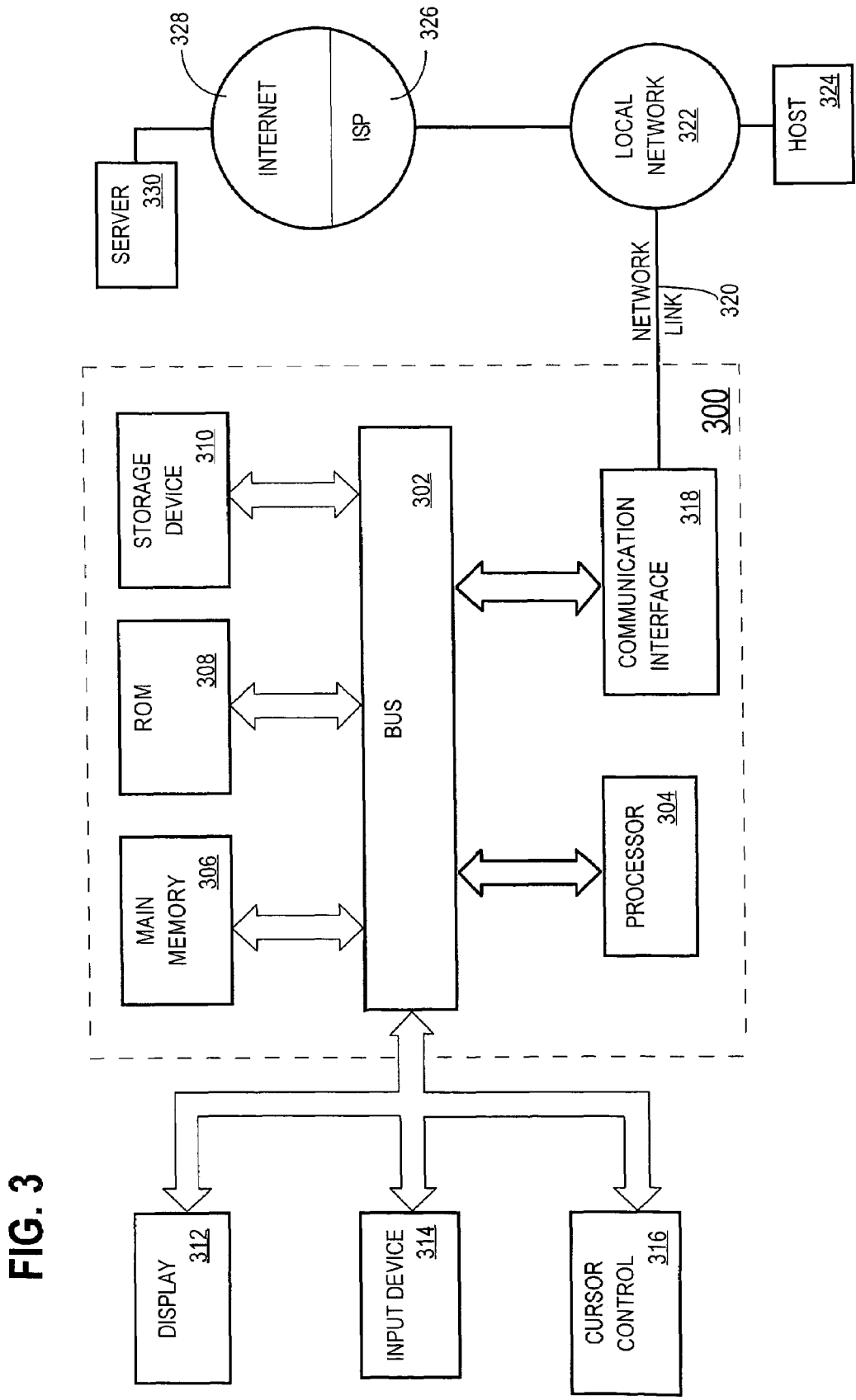
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one implementation of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for sending an ecard to a recipient from multiple users comprising:
receiving first input from a first user, wherein the first input specifies an invited user set and an intended recipient;
presenting to the first user an option for the first user to designate, for each invited user, a particular access right on the ecard for that invited user, wherein the particular access right designated for the particular invited user governs types of edits the particular invited user is allowed to make to the ecard;
in response to input from the first user, inviting each invited user in the invited user set to provide second input that affects content of the ecard; and
sending, to the intended recipient, the ecard whose content is based, at least in part, on the second input,
wherein the steps of receiving, presenting, inviting, and sending are performed by one or more computing devices.

2. The method of claim 1 further comprising:
presenting a set of ecard templates to the first user;
the first input further specifies an ecard template, selected by the first user from the set of ecard templates; and
the content of the ecard is based, at least in part, on the selected ecard template.

3. The method of claim 1 further comprising: prompting the first user to input electronic contact information for each user in the invited user set.

4. The method of claim 3 wherein inviting each invited user includes sending an invitation to sign the ecard to two or more users based on the input electronic contact information.

5. The method of claim 4, wherein the invitation to sign the ecard includes a link to the ecard.

6. The method of claim 1, further comprising:
presenting a set of personalization features to the first user, wherein the first user selects at least one feature from the set of personalization features to personalize the ecard for the recipient.

7. The method of claim 6, wherein the set of personalization features includes a personalized message feature.

8. The method of claim 6, wherein the set of personalization features includes a feature to upload multimedia content.

9. The method of claim 1, further comprising:
presenting to the first user a feature to add a message to be presented to the set of invited users.

10. The method of claim 1, wherein the particular access right is selected from one or more access rights.

11. The method of claim 10, wherein the one or more access rights include at least one of a right to change the template, a right to revise the message of an other invited user, and a right to change the contents of the ecard.

12. The method of claim 10, wherein the one or more access rights include a right of the first user to modify messages entered by the invited users.

13. The method of claim 1, wherein the first user retains veto power over the entire card's message.

14. The method of claim 1, wherein the first user retains veto power over individual messages input by invited users.

15. The method of claim 1, wherein the first user specifies a design for said ecard, and the particular access right either grants or denies the particular invited user an ability to modify the design of the ecard.

16. The method of claim 1, wherein the particular access right either grants or denies the particular invited user an ability to modify text within the ecard.

17. The method of claim 1, wherein inviting each invited user comprises inviting one or more of the invited users to provide feedback to the first user.

18. The method of claim 1, wherein inviting each invited user comprises allowing one or more of the invited users to indicate whether they accept or decline to participate in the ecard.

19. The method of claim 18, wherein sending to the first user comprises providing a tally of all invited users that have accepted or declined.

20. A computer-readable storage storing instructions for sending an ecard to a recipient from multiple users, wherein said instructions are instructions which, when executed by one or more processors, cause to one or more processors to perform the steps of:
   receiving first input from a first user, wherein the first input specifies an invited user set and an intended recipient;
   presenting to the first user an option for the first user to designate, for each invited user, a particular access right on the ecard for that invited user, wherein the particular access right designated for the particular invited user governs types of edits the particular invited user is allowed to make to the ecard;
   in response to input from the first user, inviting each invited user in the invited user set to provide second input that affects content of the ecard; and
   sending, to the intended recipient, the ecard whose content is based, at least in part, on the second input.

21. The computer-readable storage of claim 20, wherein the instructions further comprise:
   presenting a set of ecard templates to the first user;
   the first input further specifies an ecard template, selected by the first user from the set of ecard templates; and
   the content of the ecard is based, at least in part, on the selected ecard template.

22. The computer-readable storage of claim 20, wherein the instructions further comprise prompting the first user to input electronic contact information for each user in the invited user set.

23. The computer-readable storage of claim 22, wherein inviting each invited user includes sending an invitation to sign the ecard to two or more users based on the input electronic contact information.

24. The computer-readable storage of claim 23, wherein the invitation to sign the ecard includes a link to the ecard.

25. The computer-readable storage of claim 20, wherein the instructions further comprise:
   presenting a set of personalization features to the first user, wherein the first user selects at least one feature from the set of personalization features to personalize the ecard for the recipient.

26. The computer-readable storage of claim 25, wherein the set of personalization features includes a personalized message feature.

27. The computer-readable storage of claim 25, wherein the set of personalization features includes a feature to upload multimedia content.

28. The computer-readable storage of claim 20, wherein the instructions further comprise:
   presenting to the first user a feature to add a message to be presented to the set of invited users.

29. The computer-readable storage of claim 20, wherein the particular access right is selected from one or more access rights.

30. The computer-readable storage of claim 29, wherein the one or more access rights include at least one of a right to change the template, a right to revise the message of an other invited user, and a right to change the contents of the ecard.

31. The computer-readable storage of claim 29, wherein the one or more access rights include a right of the first user to modify messages entered by the invited users.

32. The computer-readable storage of claim 20, wherein the first user retains veto power over the entire card's message.

33. The computer-readable storage of claim 20, wherein the first user retains veto power over individual messages input by invited users.

34. The computer-readable storage of claim 20, wherein the first user specifies a design for said ecard, and the particular access right either grants or denies the particular invited user an ability to modify the design of the ecard.

35. The computer-readable storage of claim 20, wherein the particular access right either grants or denies the particular invited user an ability to modify text within the ecard.

36. The computer-readable storage of claim 20, wherein inviting each invited user comprises inviting one or more of the invited users to provide feedback to the first user.

37. The computer-readable storage of claim 20, wherein inviting each invited user comprises allowing one or more of the invited users to indicate whether they accept or decline to participate in the ecard.

38. The computer-readable storage of claim 37, wherein sending to the first user comprises providing a tally of all invited users that have accepted or declined.

* * * * *

UNITED STATES PATENT AND TRADEMARK OFFICE
CERTIFICATE OF CORRECTION

PATENT NO. : 7,617,276 B2
APPLICATION NO. : 11/391189
DATED : November 10, 2009
INVENTOR(S) : Susie H. Bui It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Nineteenth Day of October, 2010

David J. Kappos
*Director of the United States Patent and Trademark Office*